United States Patent
Ikeda et al.

[11] Patent Number: 5,628,499
[45] Date of Patent: May 13, 1997

[54] COUNTER VIBRATION GENERATING POWER UNIT MOUNTING DEVICE

[75] Inventors: Naoki Ikeda; Shin Takehara, both of Higashihiroshima, Japan

[73] Assignee: Mazda Motor Corporation, Hiroshima-ken, Japan

[21] Appl. No.: 188,337

[22] Filed: Jan. 25, 1994

[30] Foreign Application Priority Data

| Jan. 25, 1993 | [JP] | Japan | 5-010155 |
| Mar. 10, 1993 | [JP] | Japan | 5-049184 |
| Nov. 5, 1993 | [JP] | Japan | 5-276383 |

[51] Int. Cl.$^6$ ............................................. F16F 9/10
[52] U.S. Cl. .......................... 267/140.14; 267/140.15
[58] Field of Search .................. 267/140.14; 180/300, 180/312; 248/562, 563, 636

[56] References Cited

U.S. PATENT DOCUMENTS

| 4,638,983 | 1/1987 | Idigkeit et al. | 267/140.14 |
| 4,693,455 | 9/1987 | Andra | 267/140.14 |
| 4,869,474 | 9/1989 | Best et al. | 267/140.14 |
| 4,869,477 | 9/1989 | Hoying et al. | 267/140.14 |
| 5,145,156 | 9/1992 | Muramatsu et al. | 267/140.14 |
| 5,344,129 | 9/1994 | Ioe et al. | 267/140.15 |
| 5,388,812 | 2/1995 | Kojima et al. | 267/140.15 |

FOREIGN PATENT DOCUMENTS

| 59-110935 | 6/1984 | Japan . |
| 61-70643 | 5/1986 | Japan . |
| 1-501344 | 5/1989 | Japan . |
| 4-39481 | 9/1992 | Japan . |

*Primary Examiner*—Matthew C. Graham
*Attorney, Agent, or Firm*—Keck, Mahin & Cate

[57] ABSTRACT

An active type of mounting device for mounting a power unit to a vehicle body includes a vibratory member which generates vibrations so as to damp external vibrations applied to the mounting device from the power unit. The resonance frequency of the vibratory member is regulated by varying of the supporting stiffness or flexibility of the vibratory member or by varying of a variable mass attached to the vibratory member to obtain a specific frequency within a frequency band of external vibrations according to engine speed and/or vehicle speed.

18 Claims, 7 Drawing Sheets

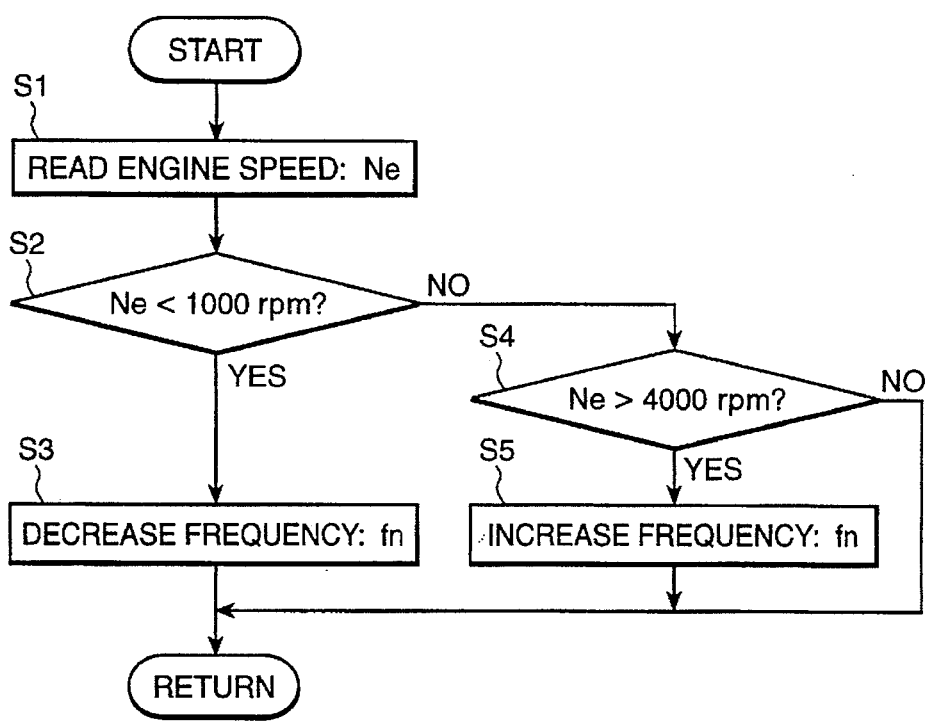
Fig. 6
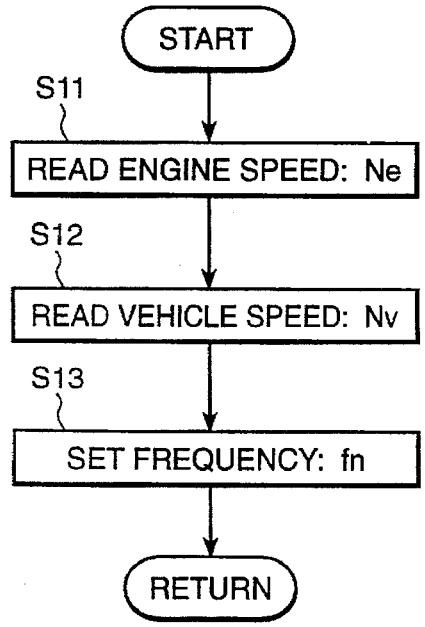
Fig. 7
Fig. 7A
|  | LOW | Ne | HIGH |
|---|---|---|---|
| LOW | $f_{00}$  $f_{01}$ | · · · · · | · $f_{0m}$ |
|  | $f_{10}$  $f_{11}$ | · · · · · | · $f_{1m}$ |
| Nv | · | · | · |
|  | · | · | · |
|  | · | · | · |
| HIGH | $f_{n0}$  $f_{n1}$ | · · · · · | · $f_{nm}$ |

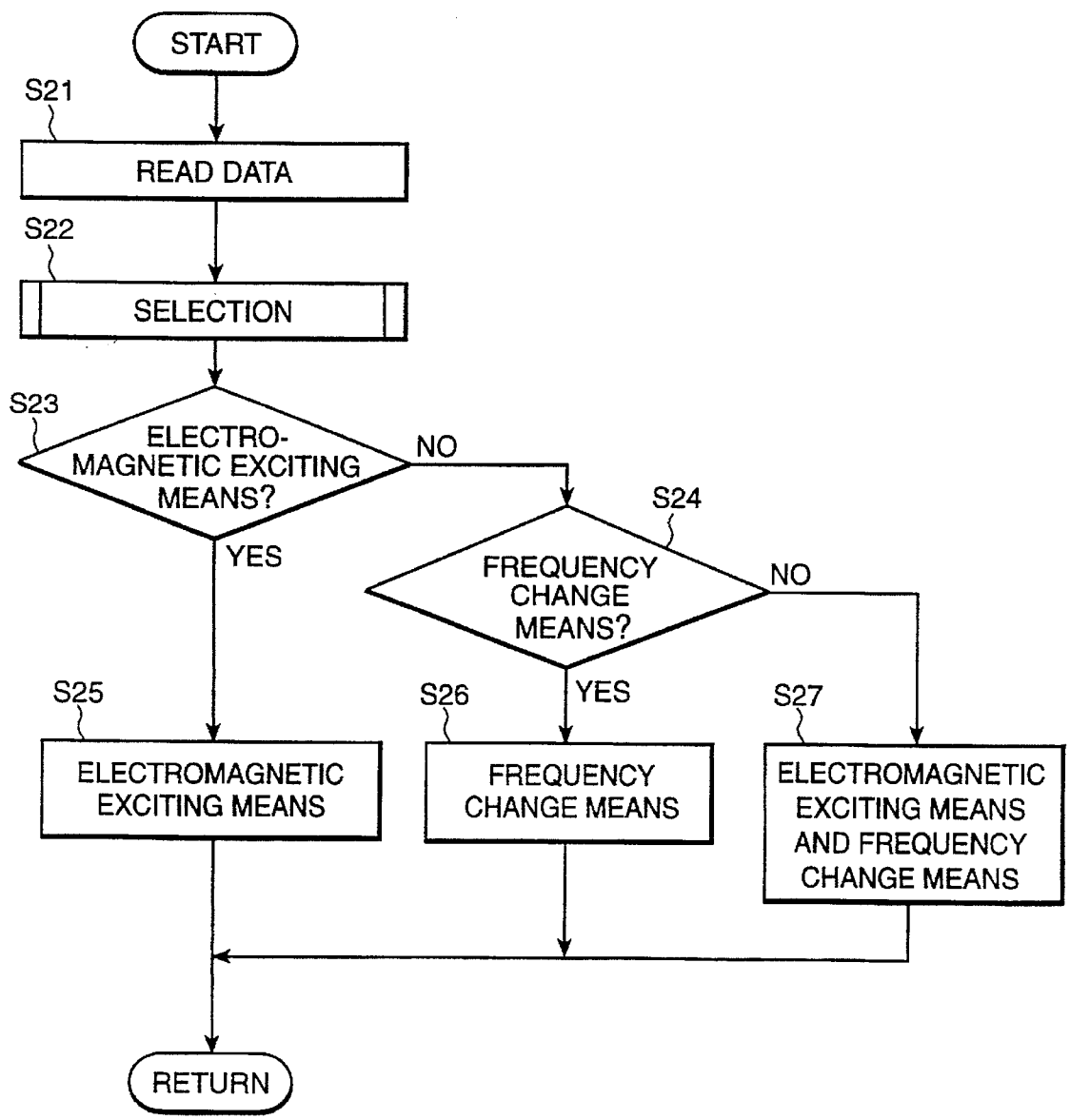

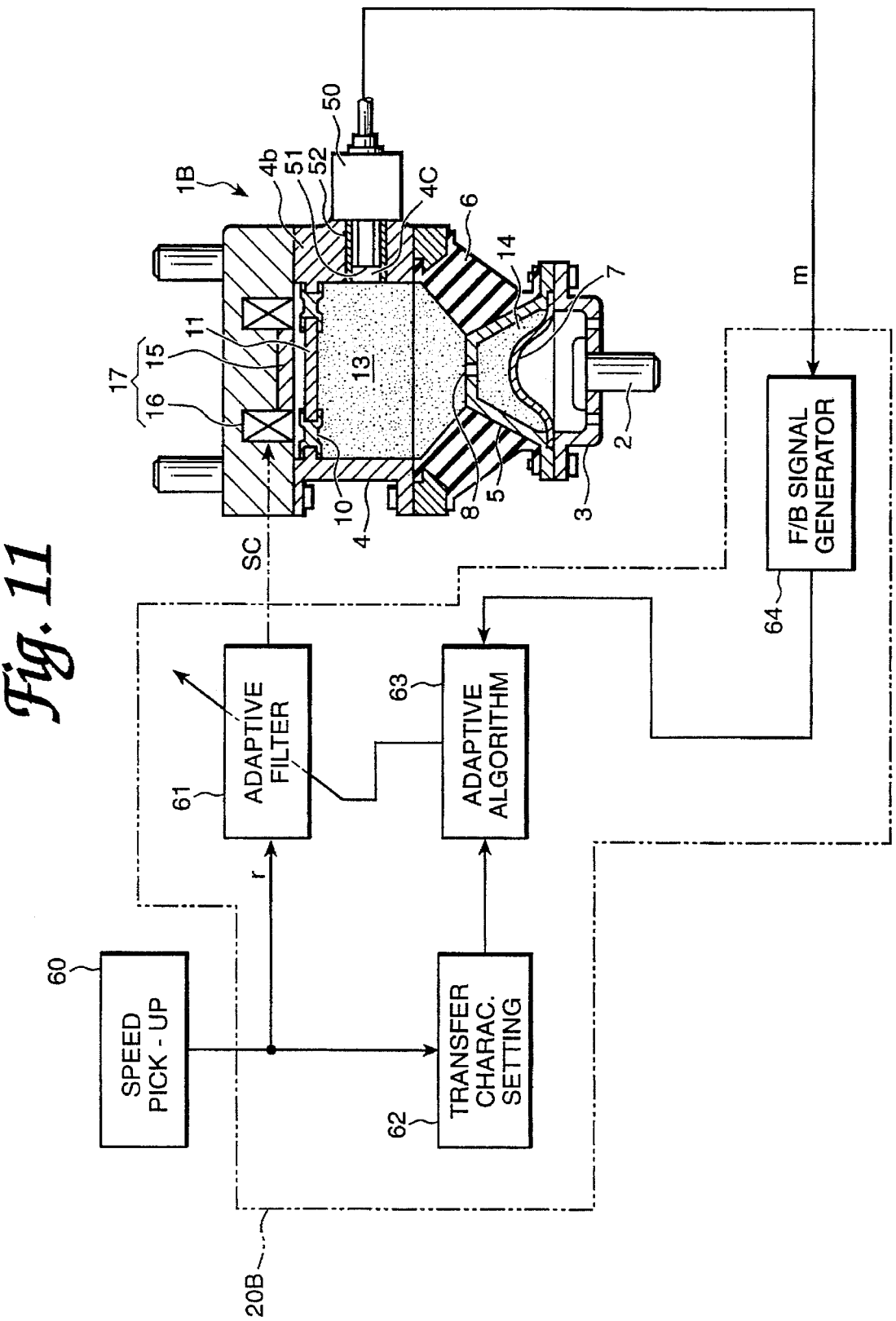

COUNTER VIBRATION GENERATING POWER UNIT MOUNTING DEVICE

BACKGROUND OF THE INVENTION

1. Field of the Invention

The present invention relates to a mounting device for mounting a power unit on a vehicle body, and, more particularly, to a power plant mounting device which self generates counter vibrations so as to cancel external vibrations applied thereto.

2. Description of Related Art

For mounting a power unit, including an engine, to a body frame of a vehicle, there have: been known mounting devices of the type having two fluid chambers. Such a power unit mounting device includes a power unit fitting member which is connected to a power unit and a base member which is secured to the vehicle body frame. These members are interconnected by means of an elastically deformable connecting member so as to form a chamber, or cavity, for containing and sealing a fluid, such as air or a liquid, therein. This fluid chamber is divided by a partition having an orifice communicating the two fluid chambers, namely, a main fluid chamber and a secondary fluid chamber in which a diaphragm is disposed. In this power unit mounting device, displacement of the fluid through the orifice causes damping of external vibrations applied to the power unit mounting device.

It has also been known to install a secondary diaphragm so as to form a secondary diaphragm chamber in the main chamber. The secondary diaphragm chamber is filled with a fluid or a gas, the pressure of which is regulated as necessary, and the secondary diaphragm is provided with a mass body functioning as a dynamic damper for reducing external vibrations more effectively. Such a power unit mounting device is known from, for instance, Japanese Unexamined Patent Publication No.59-110935.

In the power unit mounting devices of this kind, the mass body may be formed as a vibratory electromagnetic member which generates vibrations by the aid of an electromagnetic actuator so as to cancel external vibrations applied to or experienced by the mounting device. Such a power unit mounting device is known from, for instance, Japanese Utility'Model Publication No.4-39481.

In these power unit mounting devices which generate vibrations having the same amplitude as, but reverse to the phase of external vibrations applied to the mounting device for the cancellation of the applied external vibrations, it is typical to use a vibratory electromagnetic member having a resonance or resonant frequency out of the band of exciting frequencies of vibrations which the vibratory electromagnetic member is excited to generate. This is because, setting of the resonance frequency of the vibratory electromagnetic member to a frequency within the exciting frequency band causes a deterioration of the follow-up ability of excitation control of the vibratory electromagnetic member and makes the excitation control unstable. In addition to this drawback, there is a problem that the power unit mounting device requires a large amount of energy for driving or exciting the vibratory electromagnetic member.

SUMMARY OF THE INVENTION

It is an object of the present invention to provide a power unit mounting device which is free from a deterioration of the ability of follow-up excitation control of an exciting plate and is able to be excited with a small amount of energy.

The above object of the present invention is accomplished by providing an active type of power unit mounting device for mounting a power unit to a vehicle body which generates vibrations so as to cancel or damp external vibrations experienced by the power unit. The mounting unit includes a vibratory means caused to vibrate by an exciting means. The resonance frequency of the vibratory means is regulated by a frequency regulating means, for varying the supporting stiffness or flexibility of the vibratory means or for varying the mass of the vibratory means, to a specific frequency within a frequency band of external vibrations transmitted to the mounting unit according to engine speed and/or vehicle speed. The specific frequency may be the frequency of a vibration having the maximum amplitude which the power unit generates. Both the exciting means and the frequency regulating means are simultaneously or selectively actuated. Selection is made of the frequency regulating means for lower engine speeds or lower vehicle speeds and of the exciting means for higher engine speeds or higher vehicle speeds.

BRIEF DESCRIPTION OF THE DRAWINGS

The above and other objects of the present invention will be clearly understood from the following description directed to preferred embodiments thereof when considered in conjunction with the accompanying drawings, wherein the same reference numerals have been used to denote the same or similar elements or parts throughout the drawings, and in which:

FIG. 6 is a flow chart illustrating a resonance frequency control routine;

FIG. 7 is a flow chart illustrating a resonance frequency control routine;

FIG. 7A is a portrayal of a resonance frequency map;

FIG. 8 is a flow chart illustrating a power unit mounting device control main routine in accordance with a preferred embodiment of the present invention;

FIG. 11 is a schematic diagram showing the structure of a power unit mounting device in accordance with another preferred embodiment of the present invention.

DETAILED DESCRIPTION OF THE PREFERRED EMBODIMENTS

Figure 1:
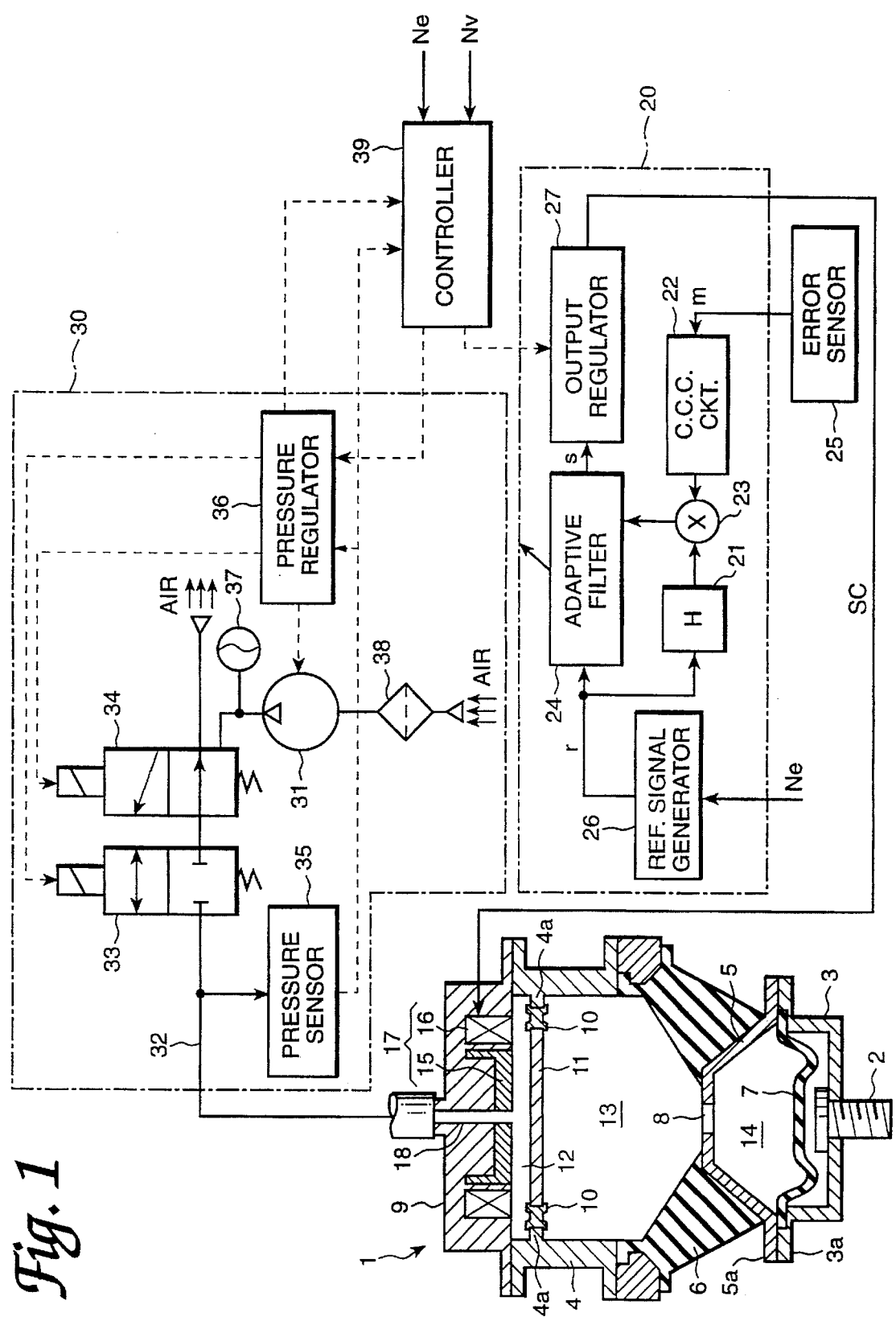
FIG. 1 is a schematic diagram showing the structure of a power unit mounting device in accordance with a preferred embodiment of the present invention.

Referring to the accompanying drawings in detail, and, in particular, to FIG. 1, the configuration of a power unit mounting device in accordance with a preferred embodiment of the present invention is shown, which includes a mounting body 1. This mounting body 1 is comprised of a cap-shaped base member 3 formed with a flange 3a through which it is secured to a vehicle body (not shown), and a hollow cylindrical fitting member 4 through which it is secured to a power unit including an engine (not shown). The mounting body 1 further includes a frusto-conical partition member 5, trapezoidal in section, formed with a flange 5a secured to the base member 3 by means of the engagement of these flanges 3a and 5a bolted, or otherwise secured, to each other and a cone-shaped elastic hollow member 6 by means of which the fitting member 4 and the partition member 5 are connected. The base member 3 is provided with a securing bolt 2 which is fastened to the frame of the vehicle body. The partition member 5 is formed at its small base with a small top opening 8 functioning as an orifice. A resilient diaphragm 7 is clamped between the base member 3 and the partition member 5. The fitting member 4 is closed at its top with a non-magnetic metal cover member 9 via cooperating flanges. Member 4 is formed with an internal flange 4a spaced apart from the top cover member 9 by a specified axial distance to provide clearing for disk 11 vibrations. Vibratory magnetic disk 11 is supported or mounted by the internal flange 4a through an elastic ring 10 by means of which the supporting stiffness or flexibility of the vibratory magnetic disk 11 is selectively determined. The mounting body 1 thus configured provides an air-tight space divided by the partition member 5 and disk 11 into three chambers, namely, a main chamber 13, a diaphragm chamber 14, which is smaller than the main chamber 13, and an air space or cavity 12. These chambers 13 and 14 are in communication with each other by means of the orifice 8 of the partition member 5 and filled with a fluid, such as air. The cover member 9 has an electromagnetic actuator 17 mounted thereon, comprising an electromagnetic coil embedded in disk 11 and a stationary magnetic disk 15 fixedly attached to the lower surface thereto so as to face or oppose the vibratory magnetic disk 11. Chamber 12 provides a predetermined gap to allow unconstrained vibration of disk 11. The electromagnetic coil 16 partly embedded in the cover member 9 and surrounding stationary magnetic disk 15 drives or induces vibrations of the vibratory magnetic disk 11. Further, the cover member 9 is formed with an axial through bore 18 forming a passage for introducing therethrough air into the air cavity 12 from an external pressure source through an air pipe 32. The mounting body 1 operates such that when the electromagnetic coil 16 is supplied with an alternating current of appropriate frequency, amplitude and phase from an actuator exciting unit 20 corresponding to or correlated with external vibrations transmitted to the mounting body 1 from the power unit, the vibratory magnetic disk 11 is actuated or driven to generate vibrations having the same amplitude but reversed phase as the external vibrations so as to cancel, dissipate or absorb the external vibrations.

Actuator exciting unit 20, which uses a least mean square method (LMS) as an adaptive algorithm in order to generate an exciting signal sc for the electromagnetic actuator 17 of the mounting body 1, has a digital filter 21, a convergence factor calculation circuit 22, a multiplication means 23 and an adaptive filter 24. Specifically, the digital filter 21 is a modeled filter of a transfer function of H(IM) (I=1, 2, . . . . , i: M =1, 2, . . . , m) from the provision of an exciting signal sc to the input of a signal m provided by an error sensor 25, which is representative of a change in vibration caused on the vehicle frame as a result of vibrations of the vibratory magnetic disk 11 of the mounting body 1 generated according to the exciting signal cs, into a convergence factor calculation circuit 22. The convergence factor calculation (C.C.C.) circuit 22 calculates a convergence factor α with which a filter factor is rewritten in accordance with a m signal provided by the error sensor 25. The outputs from the digital filter 21 of the transfer function (H) and the convergence factor calculation circuit 22 are multiplied in the multiplication means 23, and the resultant output is sent to the adaptive filter 24. This adaptive filter 24 renews its filter factor in accordance with the level of every output from the multiplication means 23 and generates a basic exciting signals having the same amplitude and the same but reversed phase as a reference signal r in accordance with the renewed filter factor. This reference signal r is representative of the rotational speed of an engine and provided by a reference signal generator 26. After the exciting signal has been changed into an exciting signal sc in the form of an alternating current by an exciting signal regulator 27, it is sent to the electromagnetic coil 16.

The resonance frequency of the vibratory magnetic disk 11 is variably regulated in accordance with a change in the supporting stiffness or flexibility of the vibratory magnetic disk 11 which, in turn, is controlled by variable regulation of the pressure of air within the air cavity 12. In order to control or change the resonance frequency of the vibratory magnetic disk 11, the mounting body 1 is in cooperation with a resonance frequency regulating unit 30. This resonance frequency regulating unit 30 includes an air compressor 31, first and second two-port electromagnetic valves 33 and 34 disposed in series in air pipe 32 connecting the air compressor 31 to the air passage 18 of the cover member 9, a pressure sensor 35 disposed in the air pipe 32 for detecting the pressure of air in the air cavity 12, and an air pressure regulator 36 for controlling or regulating the air compressor 31 and the first and second electromagnetic valves 33 and 34 in accordance with or responsive to the output of the pressure sensor 35 so as to regulate the pressure of air in the air cavity 12. There are provided in the resonance frequency regulating unit 30 an accumulator 37 and an air filter 38 after and before the air compressor 31, respectively.

Figure 2:
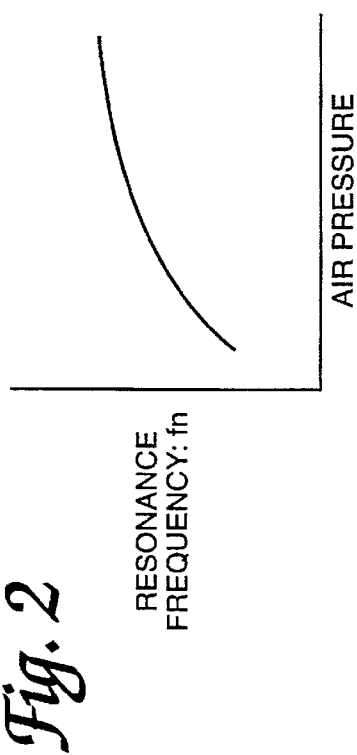
FIG. 2 is a diagram showing the relation between resonance frequency and air pressure.

These electromagnetic valves 33 and 34 are operated such that when there is a demand for holding the pressure of air in the air cavity 12 unchanged, they are closed as shown in FIG. 1, and when there is a demand for an increase in the pressure of air in the air cavity 12, they are opened sc as to enable compressed air to be forced into the air cavity 12 by the air compressor 31. Further, when only the first electromagnetic valve 33 is opened, it brings or vents the air pipe 32 into communication with the atmosphere so as to drop the pressure of air in the air cavity 12. By changing or regulating the pressure of air in the air cavity 12 in such a manner, the vibratory magnetic disk 11 is changed in supporting stiffness or flexibility, changing its own resonance frequency $f_n$ approximately in proportion to the square root of the pressure of air in the air cavity 12 as shown in FIG. 2.

Relating to both actuator exciting unit 20 and resonance frequency regulating unit 30, there is provided a controller 39 for controlling the exciting signal regulator 27 and the air pressure regulator 36 in accordance with both or either one of engine speed and vehicle speed.

Figure 3:
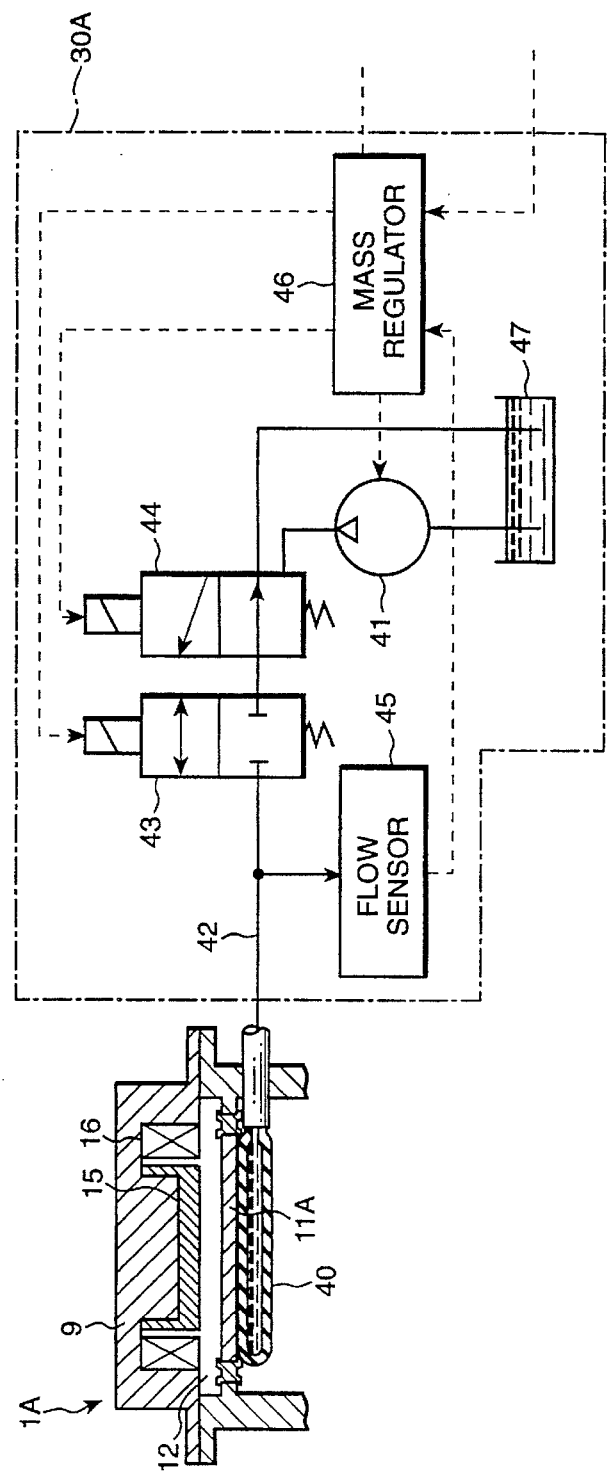
FIG. 3 is a schematic diagram showing the structure of a power unit mounting device in accordance with another preferred embodiment of the present invention.

Resonance frequency regulating unit 30 may be structurally changed as shown in FIG. 3. A mounting body 1A in cooperation with a resonance frequency regulating unit 30A is configured such that a vibratory magnetic disk 11A is changed in mass so as to change its resonance frequency. Specifically, the vibratory magnetic disk 11A is provided with an expandable fluid container 40, fixed to the under surface thereof, into which a fluid can be introduced as a mass changing medium. However, the air cavity 12 is air tightly closed. The resonance frequency regulating unit 30A includes a fluid pump 41 for supplying a fluid into the fluid container 40 from a reservoir 47 and discharging it into the reservoir 47 from the fluid container 40, first and second two-port electromagnetic valves 43 and 44 disposed in series in a fluid pipe 42 connecting the fluid pump 41 to the fluid container 40 of the vibratory magnetic disk 11A, a flow rate sensor 45 disposed in the fluid pipe 42 for detecting the flow rate of fluid into the fluid container 40, and a fluid mass regulator 46. This fluid mass regulator 46 regulates the drive of the fluid pump 41 (or controls the pump directly) and the first and second electromagnetic valves 43 and 44 in accordance with the output of the flow rate sensor 45 so as to regulate the mass of fluid in the fluid container 40 of the vibratory magnetic disk 11A. These electromagnetic valves 43 and 44 are operated in the same manner as those of the previous embodiment shown in FIG. 1. In this instance, because changing of the fluid mass in the fluid container 40 of the vibratory magnetic disk 11A causes a change in supporting stiffness or flexibility, the resonance frequency $f_n$ of the vibratory magnetic disk 11A changes approximately in proportion to the square root of the fluid mass in the fluid container 40 of the vibratory magnetic disk 11A.

Figure 4:
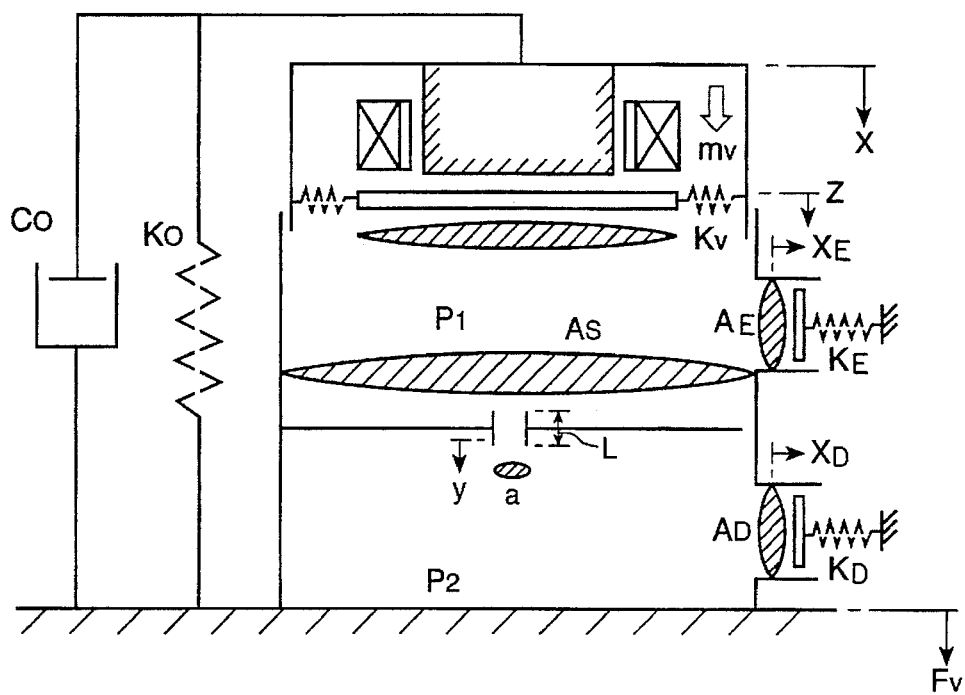
FIG. 4 is a diagram showing an equivalent circuit of a mount body of the power unit mounting device of FIG. 1.

Referring to FIG. 4 showing an equivalent circuit of the mounting body 1 or 1A, the resonance frequency $f_n$ of the vibratory magnetic disk 11 or 11A is obtained based on various factors of the equivalent circuit from the following calculation.

Various factors in the following equations are:
Ko is the stiffness of the support spring;
Co is the damping coefficient of the support spring;
$K_E$ is the stiffness of the main chamber expanding spring;
$K_D$ is the stiffness of the diaphragm chamber expanding spring;
As is the pressure area of the main chamber;
$A_E$ is the expanded pressure area;
$A_D$ is the pressure area of the diaphragm chamber;
$C_E$ is the damping factor of the main chamber expanding spring;
Kv is the stiffness of the vibrator disk;
mv is the mass of the vibrator disk;
Av is the area of the vibrator disk;
$P_1$ is the pressure in the main chamber;
$P_2$ is the pressure in the main chamber;
Fv is the vibration force of the actuator;
a is the cross sectional area of the orifice;
L is the length of the orifice;
m is the mass of flow in the orifice;
$C_{DE}$ is the damping factor of the orifice;
x is the displacement of the main chamber;
$x_E$ is the expanded displacement of the main chamber;
$Y_D$ is the expanded displacement of the diaphragm chamber;
y is the displacement of flow in the orifice; and
z is the displacement of the vibrator plate.

First of all, vibrating force Fv of the electromagnetic coil 16 as an exciting actuator is expressed by equation (1) as follows:

$$Fv = m_v d^2z/dt + Kvdz/dt + P_1 A_E \qquad (1)$$

The equilibrium of force in an expansion spring leads to the following equations (2) and (3):

$$K_E X_E = A_E P_1 \qquad (2)$$

$$K_D X_D = A_D P_2 \qquad (3)$$

The equilibrium of flow rate leads to the following equations (4) and (5):

$$A_s X + A_v Z = A_E X_E + ay \qquad (4)$$

$$ay = A_D X_D \qquad (5)$$

The equation of motion in the orifice 8 expressed by the following equation (6):

$$m d^2 y/dt + C_{OR} dy/dt + a(P_2 - P_1) = 0 \qquad (6)$$

Accordingly, the equations (2), (3), (4) and (5) can be rewritten as follows:

$$P_1 = K_E X_E / A_E \qquad (2')$$

$$P_2 = K_D X_D / A_D \qquad (3')$$

$$X_E = (A_s X + A_v Z - ay)/A_E \qquad (4')$$

$$X_D = ay/A_d \qquad (5')$$

Substituting the equations (4') and (5') into the equations (2') and (3'), respectively:

$$P_1 = K_E/A_E \{(A_s X + A_v Z - ay)/A_E\} \qquad (7)$$

$$P_2 = K_D/A_D (a/A_D) Y \qquad (8)$$

Substituting the equations (7) and (8) into the equation (6):

$$md^2y/dt + C_o dy/dt + \{(a^2 K_D/A_D^2) + (a^2 k_E/A_E^2)\} Y = (aA_E/A_E^2)K_E X + (aA_v/A_E^2)K_E z \qquad (9)$$

Then, substituting the equation (4') into the equation (1):

$$Fv = m_v d^2z/dt + Kvdz/dt + K_E x_E = m_v d^2z/dt + Kvdz/dt + K_E(A_s X + A_v z - ay)/A_E \qquad (10)$$

Here, conducting Laplace transformation to the equation (9):

$$[m_v s^2 C_{OR} + Kv + \{(a^2 K_D/A_D^2) + (a^2 K_E/A_E^2)\}] Y_{(s)} = \qquad (11)$$
$$(a A_E/A_E^2) K_E X_{(s)} + (a A_v/A_E^2) K_E Z_{(s)} = $$
$$(a K_E/A_E^2)(A_E X_{(s)} + A_V Z_{(s)})$$

And, conducting Laplace transformation to the equation (10):

$$[m_v s^2 + Kv + A_v K_E] Z_{(s)} - (K_E/A_E)(A_s X_{(s)} - a Y_{(s)}) \qquad (12)$$

From the equations (11) and (12), the following equations (13) and (14) can be derived, respectively:

$$y = \{1/(-m\epsilon^2 + C_{OR} \epsilon + (a^2 K_D/A_D^2) + (a^2 K_E/A_E^2)\} \qquad (13)$$
$$\{(a K_E/A_E^2)(A_E x + A_V z)\}$$
$$= \{1/[(-A_s^2 m\epsilon^2/a^2) + (A_s^2 C_{OE} \epsilon^2/a^2) + (A_s^2 K_D/A_D^2) + (A_s^2 K_E/A_E^2)]\} \{(A_s^2 K_E/A_E^2)(A_V x + A_V z)\}$$

$$\qquad (14)$$
$$z = \{1/(-m\epsilon^2 + Kv + Av K_E/A_E)\} \{Fv - (K_E/A_E)(A_E x + Av z)\}$$

When substituting M, C, $K_1$ and $K_2$ into $(A_s^2 m/a^2)$, $(A_s^2 C_o/a^2)$, $(A_s^2 K_E/A_E^2)$ and $(A_s^2 K_D/A_D^2)$, respectively, the equation (13) is expressed as follows:

$$Y = \{1/(K_1 + K_2 - M\epsilon^2 + Ci\epsilon)\} K_1 (A_s X + A_v z) \qquad (15)$$

Since $K_E$ is rewritten as $A_E^2 k_E / A_s^2$, the equation (14) is expressed as follows:

$$z = \{1/(A_E^2 K_v/A_v^2) + [(A_E K_1/A_v) - (A_s^2 m_v \epsilon^2/A_v^2)]\} \{(A_s^2 Fv/A_v^2) - $$

$$(A_s^2 K_1/A_v)[(A_s x/A_v) - (\alpha y/A_v)]\} \quad (16)$$

When substituting $M_v$ and $K_3$ into $(A_s^2 mv/A_v^2)$ and $(A_s^2 Kv/Av^2)$, respectively, the equation (16) is expressed as follows:

$$z=\{1/(K_3+A_s K_1/Av-Mv\epsilon^2)\}\{(A_s^2 Fv/A_v^2)-(A_E K_1/A_v)[(A_s x/A_v)-(\alpha y/A_v)]\} \quad (17)$$

From the above equations, the resonance frequency $f_n$ of the vibratory magnetic disk 11 and its angular velocity $\epsilon_n$ are obtained as follows:

$$\epsilon_n = \{(K_3 + A_E K1/Av)/Mv\}^{1/2} \quad (18)$$

$$= \{(K_V + Av K_E/A_E)/m_v\}^{1/2}$$

$$f_n = (1/2\pi) \{(K_V + Av K_E/A_E)/m_v\}^{1/2} \quad (19)$$

Figure 5:
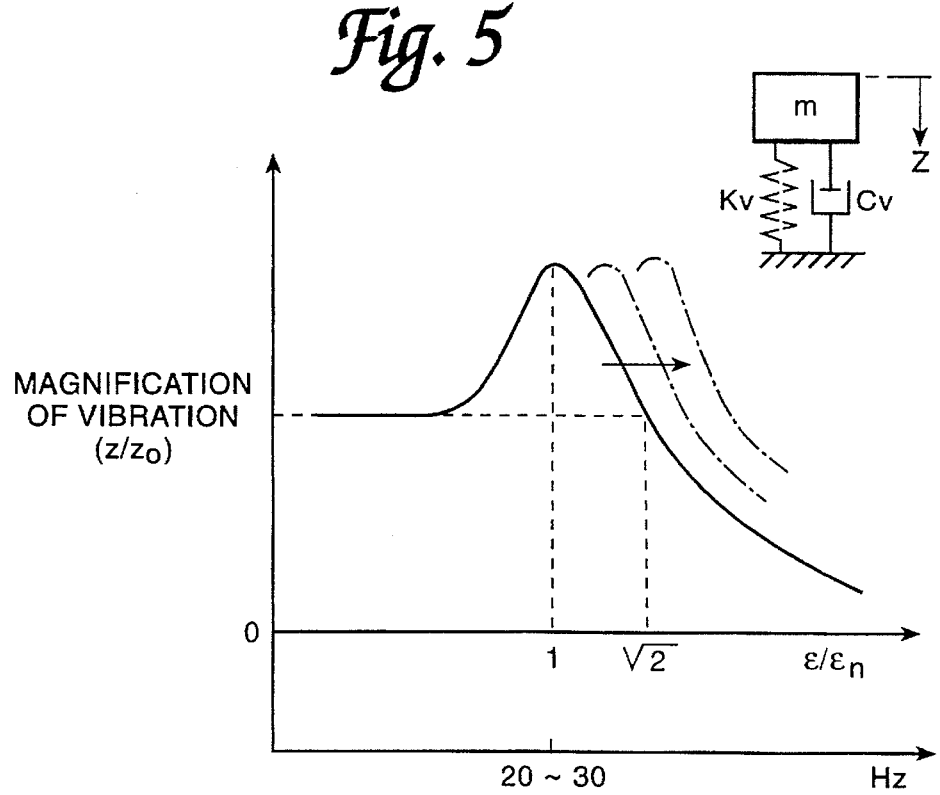
FIG. 5 is a diagram showing the relation between resonance frequency and the amplitude of vibration.

As apparent from the equation (19), the resonance frequency $f_n$ of the vibratory magnetic disk 11 is determined based on the parameters, such as the area of the vibrator disk Av, the stiffness of the main chamber expanding spring $K_E$, the pressure area of the main chamber As, the expanded pressure area $A_E$, and the mass of the vibrator disk mv. In the configuration of the power unit mounting device shown in FIG. 1, regulating or controlling of the pressure of air in the air cavity 12 so as to change the supporting stiffness or flexibility of the vibratory magnetic disk 11 causes a change in the resonance frequency $f_n$ of the vibratory magnetic disk 11. Also, in the configuration of the power unit mounting device shown in FIG. 3, regulating or controlling of the mass of the vibratory magnetic disk 11A so as to change the supporting stiffness or flexibility of the vibratory magnetic disk 11A causes a change in the resonance frequency $f_n$ of the vibratory magnetic disk 11A. In order to cancel external vibrations transmitted from engines, for instance in-line four cylinder engines, the resonance frequency $f_n$ of the vibratory magnetic disk 11 or 11A is set equal to a secondary frequency of the highest idling rotation (600–900 rpm) at which the engine causes vibrations having the largest amplitude. The relation between resonance frequency $f_n$ and magnification of vibration $(z/z_o)$ of the vibratory magnetic disk 11 is shown in FIG. 5, wherein $z_o$ represents the deflection of the vibratory magnetic disk 11 for a static load Fo and is expressed by Fo/Kv.

Referring to FIG. 6, which is a flow chart of the routine of resonance frequency control in the case where the exciting signal regulator 27 of the actuator exciting unit 20 and the air pressure regulator 36 of the resonance frequency regulating unit 30 are simultaneously controlled in accordance with an engine speed Ne, the resonance frequency fn of the vibratory magnetic disk 11 is controlled to as close as or match an exciting frequency, thereby providing an exciting force with an electromagnetic energy as large as possible.

In the resonance frequency control, after the controller 39 has read the speed of an engine at step S1, a decision is made at step S2 as to whether the engine speed Ne is within an idling speed range which is defined less than a predetermined speed, for instance 1000 rpm. If the engine speed Ne is within the idling speed range, in other words, the answer to the decision is "YES," then, the controller 29 controls the air pressure regulator 36 so as to decrease the resonance frequency $f_n$ of the vibratory magnetic disk 11 to an intended frequency at step S3. On the other hand, if the engine speed Ne is out of the idling speed range, in other words, the answer to the decision is "NO," then, a decision is made at step S4 as to whether the engine speed Ne is within a high speed range which is defined higher than a predetermined speed, for instance 4000 rpm. If the engine speed Ne is within the high speed range, in other words, the answer to the decision is "YES," then, the controller 29 controls the air pressure regulator 36 so as to increase the resonance frequency fn of the vibratory magnetic disk 11 to an intended frequency at step S5. In this resonance frequency control, in order to prevent hunting of the resonance frequency, it is desired to give the resonance frequency characteristic of the vibratory magnetic disk 11 an appropriate hysteresis relating to engine speed.

FIG. 7 is a flow chart of the routine of resonance frequency control in the case where the exciting signal regulator 27 of the actuator exciting unit 20 and the air pressure regulator 36 of the resonance frequency regulating unit 30 are simultaneously controlled in accordance with both engine speed Ne and vehicle speed Ve. After having read an engine speed Ne at step S11 and a vehicle speed Ve at step S12, a resonance frequency fn is read from a resonance frequency map (see FIG. 7A) at step S13.

Referring to FIG. 8, shown therein is a flow chart of the main routine of resonance frequency control in the case where the exciting signal regulator 27 of the actuator exciting unit 20 and the air pressure regulator 36 of the resonance frequency regulating unit 30 or the fluid mass regulator 46 of the resonance frequency regulating unit 30A are selectively controlled so as to control external vibrations from the power unit mounting device 1. In this instance, when only the air pressure regulator 36 or the fluid mass regulator 46 is under control, the vibratory magnetic disk 11 or 11A, which is not electromagnetically activated to generate vibrations, functions as a dynamic damper.

After having read various necessary data at step S21, a determination is made at step S22 as to the selection of the regulators 27 and 36 or 40, and more specifically, which regulator has to be controlled or whether control of both regulators 27 and 36 or 40 have to be suspended. This determination is executed by the subroutine shown in FIG. 9.

Figure 9:
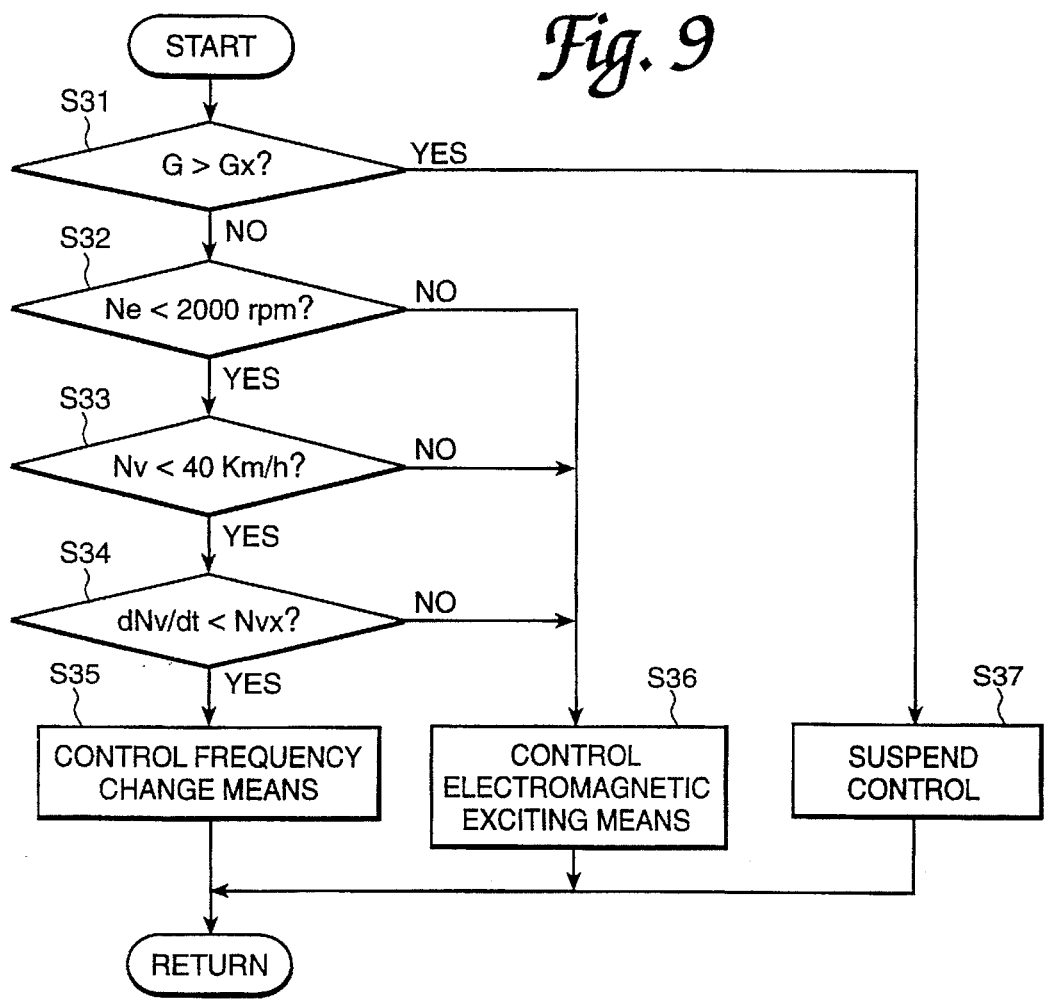
FIG. 9 is a flow chart illustrating a control unit selective control subroutine.

Referring to FIG. 9 showing a flow chart illustrating the regulator selection subroutine, the control sequence commences and control passes directly to step S31 where a decision is made as to whether the mounting device 1 is subjected to an acceleration of gravity G higher than a predetermined value Gx. If the answer to the decision is "YES," then, a determination is made at step S37 that control of both regulators 27 and 36 or 40 have to be suspended. However, if the answer to the decision is "NO," then, decisions are subsequently made at steps S32, S33 and S34. That is, a decision is made at step S32 as to whether an engine speed is higher than a predetermined speed of 2000 rpm. If the answer is "YES," then, a decision is made at step S33 as to whether a vehicle speed is higher than a predetermined speed of 40 Km/h. If "YES," then, a final decision is made at step S34 whether a vehicle acceleration δNv is smaller than a predetermined value Nvx. If the answer to the final decision made at step S34 is "YES," then, a selection is made of the resonance frequency regulating means, namely, the air pressure regulator 36 of the resonance frequency regulating unit 30 or the fluid mass regulator 46 of the resonance frequency regulating unit 30A, at step S35. However, in any case that the answer to the decision made at step S32, S33 or S34 is "NO," then, a selection is made of the electromagnetic exciting means, namely, the exciting signal regulator 27 of the actuator exciting unit 20, at step S36.

Figure 10:
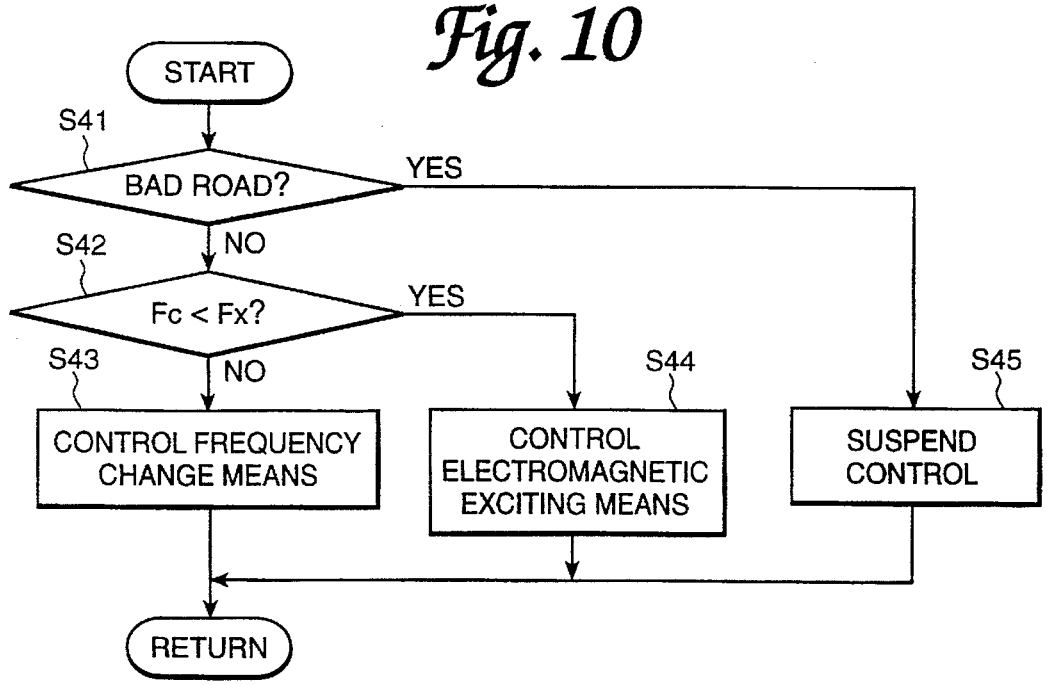
FIG. 10 is a flow chart illustrating a power unit mounting device control main routine in accordance with another preferred embodiment of the present invention.

This regulator selection may be performed in a different subroutine illustrated by a flow chart in FIG. 10.

The first step at step S41 is to make a decision as to whether a road condition is bad. If, as a result of the decision, the road is judged to be bad, then, a determination is made at step S45 that control of both regulators 27 and 36 or 40 have to be suspended. However, if the answer to the decision is "NO," then, another decision is subsequently made at step S42 as to whether a specific order of frequency component of engine rotation is higher than a predetermined frequency. If the answer is "NO," then, a selection is made of the resonance frequency regulating means, namely the air pressure regulator 36 of the resonance frequency regulating unit 30 or the fluid mass regulator 46 of the resonance frequency regulating unit 30A, at step S43. However, if the answer to the decision made at step S42 is "YES," then, a selection is made of the electromagnetic exciting means, namely the exciting signal regulator 27 of the actuator exciting unit 20, at step S44.

Returning back to FIG. 8, after the execution of the regulator selection subroutine at step S22, a decision is made at step S23 as to whether the electromagnetic exciting means has been selected. If in fact the electromagnetic exciting means has been selected, the controller actually drives it at step S25. However, when the electromagnetic exciting means has not been selected, then, another decision is made at step S24 as to whether the resonance frequency regulating means has been selected. If in fact the resonance frequency regulating means has been selected, the controller actually drives it at step S26. However, if the answer to the decision made at step S24 is "NO," this indicates that neither the electromagnetic exciting means nor the resonance frequency regulating means has been selected, then, the controller suspends driving of these means at step S27.

In the power unit mounting device, by means of selectively actuating and controlling of these frequency regulating means and actuator exciting means, the controller provides an effective vibration control without increasing a load of the actuator means. By the use of a least mean square method (LMS) as an adaptive algorithm for generating an excitation control signal s, the ability of follow-up excitation control of the power unit mounting device is greatly improved in spite of controlling the resonance frequency fn of the vibratory magnetic disk 11 as close as possible to the frequency of external vibration to be controlled.

In this instance, it is to be understood that these frequency regulating means and actuator exciting means may be governed by a proportional control in place of being selectively controlled.

Referring to FIG. 11, a power unit mounting device 1B in accordance with another preferred embodiment of the present invention is shown, in which control is made so as to cancel a residual vibration of the mounting device.

Because the power unit mounting device 1B has basically the same configuration as those of the previous embodiments excepting that it has no introduction of fluid into a cavity 12 formed between a cover member 9 and a vibratory magnetic disk 11 and is provided with a pressure sensor for detecting the pressure of a non-compressive fluid filled in a fluid chamber 13, the following description will be directed only to the differences.

Fitting member 4 is provided with a pressure sensor 50 attached to the wall 4b thereof. In more detail, the pressure sensor 50 has an elongated pressure sensing head 51. The wall 4b of the fitting member 4 is formed with a radial bore 4c for air-tightly receiving therein a sealing sleeve 52 in which the pressure sensing head 51 slides smoothly. The pressure sensor 50 detects a change in the pressure of fluid P in the fluid chamber 13, which is equivalent to the mass of flow between the main and diaphragm chambers 13 and 14, on the basis of sliding movement of the pressure sensing head 51 and provides a pressure change signal m.

Power unit mounting device 1B is controlled by an actuator exciting unit 20B which provides an exciting signal sc with which an electromagnetic actuator 17 is excited so as to cause a vibratory magnetic disk 11 to vibrate. Specifically, the actuator exciting unit 20B includes an adaptive digital filter 61, an adaptive algorithm means 63 using a least mean square method (LMS), and a feedback signal generator 64. The adaptive digital filter 61 filters a reference signal r provided by an engine speed pick-up 65 and provides an exciting signals to the electromagnetic actuator 17. This reference signal r is made based on an engine speed represented by, for instance, an ignition pulse generated by a distributor and includes information concerning a mode, a magnitude, a frequency and a phase of external vibration to be controlled. The adaptive algorithm means 63 regulates an output factor of the adaptive digital filter 61 so as to converge the pressure change represented by the pressure change signal m to the smallest value. It is apparent that the pressure change in the pressure of fluid P in the fluid chamber 13 is a pressure change due to residual vibrations after the cancellation of external vibrations, which are generated from an engine and transmitted to the mounting device, with vibrations compulsorily generated in the mounting device. The feedback signal generator 64 provides a feedback control signal, with which the residual external vibrations are damped in feedback control, by multiplying a pressure change signal by a specified convergence factor. For the adaptive algorithm using a Least Mean Square Method, the actuator exciting unit 20B further includes a transfer characteristic setting means 32 comprising a digital filter modeled with a transfer function of H(IM) (I=1, 2, . . . . . , i: M=1, 2, . . . , m) of a control system between the electromagnetic actuator 17 and the pressure sensor 50.

With the power unit mounting device 1B, the adaptive algorithm means 63, to which a feedback control signal provided by the feedback signal generator 64 based on a pressure change signal m is sent from the feedback signal generator 64, regulates the output factor of the adaptive digital filter 61 so as to minimize the level of the feedback control signal every sampling period, thereby converging the residual external vibration to as small a value as possible. As a result, a reference signal r, representing conditions of external vibrations generated by the engine, is transformed by the adaptive digital filter 61 and applied to the electromagnetic actuator 17 as an exciting signal s feedback controlled precisely using, as a control parameter, a change in the non-compressive fluid in the fluid chamber 13 due to residual external vibrations of the mounting device. This exciting signal s causes the vibratory magnetic disk 11 to generate desirable mode and phase of vibrations so as to cancel external vibrations more effectively according to actually damped vibrations.

Although the present invention has been described in detail with respect to preferred embodiments thereof, various other embodiments and variants may occur to those skilled in the art, which fall within the scope and spirit of the invention. Such other embodiments and variants are intended to be covered by the following claims.

What is claimed is:

1. A power unit mounting device for mounting a power unit to a vehicle body and canceling vibrations applied thereto from the power unit, comprising:

vibratory means, flexibly supported by a portion of said power unit mounting device, for generating vibrations in the power unit mounting device;

exciting means for causing said vibratory means to generate said vibrations in the power unit mounting device so as to reduce vibrations transmitted to said power unit mounting device from said power unit; and frequency regulating means for adjusting a natural resonance frequency of said vibratory means to a predetermined frequency within a frequency band of vibrations which may be transmitted to the power unit mounting device.

2. A power unit mounting device as defined in claim 1, wherein said frequency regulating means sets the natural resonance frequency of said vibratory means to a frequency of a vibration having the largest amplitude generated by the power unit.

3. A power unit mounting device as defined in claim 1, wherein said frequency regulating means includes resonance frequency regulating means for changing the natural resonance frequency of said vibratory means.

4. A power unit mounting device as defined in claim 3, wherein said resonance frequency regulating means changes a supporting flexibility of said vibratory means.

5. A power unit mounting device as defined in claim 3, wherein said resonance frequency regulating means includes a variable mass fixed to said vibratory means and changes the natural resonance frequency by changing said variable mass.

6. A power unit mounting device as defined in claim 3, and further comprising control means for simultaneously controlling said exciting means and said resonance frequency regulating means.

7. A power unit mounting device as defined in claim 6, wherein said control means detects an engine speed and causes said frequency regulating means to change said natural resonance frequency of said vibratory means in accordance with said engine speed.

8. A power unit mounting device as defined in claim 6, wherein said control means detects a vehicle speed and causes said frequency regulating means to change said natural resonance frequency of said vibratory means in accordance with said vehicle speed.

9. A power unit mounting device as defined in claim 3, and further comprising control means for selectively controlling said exciting means and said resonance frequency regulating means.

10. A power unit mounting device as defined in claim 9, wherein said control means detects an engine speed, actuates said exciting means when detecting that said engine speed within a predetermined high engine speed range, and actuates said resonance frequency regulating means when detecting that said engine speed within a predetermined low engine speed range.

11. A power unit mounting device as defined in claim 9, wherein said control means detects a vehicle speed, actuates said exciting means when detecting that said vehicle speed is within a predetermined high vehicle speed range, and actuates said resonance frequency changing means when detecting that said vehicle speed is within a predetermined low vehicle speed range.

12. A power unit mounting device for mounting a power unit to a vehicle body and canceling vibrations applied thereto from the power unit comprising:

vibratory means, flexibly supported by a portion of said power unit mounting device, for generating vibrations in the power unit mounting device; and frequency regulating means for adjusting a natural resonance frequency of said vibratory means to a predetermined frequency within a frequency band of vibrations transmitted to the mounting device so as to reduce vibrations transmitted to said power unit mounting device from said power unit.

13. A power unit mounting device as defined in claim 12, wherein said frequency regulating means sets the natural resonance frequency of said vibratory means to a frequency of a vibration having the largest amplitude generated by said power unit.

14. A power unit mounting device as defined in claim 12, wherein said frequency regulating means includes natural frequency changing means for changing the natural resonance frequency of said vibratory means.

15. A power unit mounting device as defined in claim 14, wherein said natural frequency changing means changes a supporting flexibility of said vibratory means.

16. A power unit mounting device as defined in claim 14, wherein said natural frequency changing means includes a variable mass fixed to said vibratory means and changes the natural resonance frequency by changing said variable mass.

17. A power unit mounting device as defined in claim 14, and further comprising control means for detecting an engine speed and causing said frequency regulating means to change said natural resonance frequency of said vibratory means in accordance with said engine speed.

18. A power unit mounting device as defined in claim 14, and further comprising control means for detecting a vehicle speed and causing said frequency regulating means to change said natural resonance frequency of said vibratory means in accordance with said vehicle speed.

* * * * *